(12) United States Patent
Tacke

(10) Patent No.: US 8,220,745 B2
(45) Date of Patent: Jul. 17, 2012

(54) CONNECTION ARRANGEMENT FOR CONNECTING A FIRST AND SECOND REINFORCING ELEMENT FOR AN AIRCRAFT OR SPACECRAFT, AND A SHELL COMPONENT

(75) Inventor: Stefan Tacke, Buxtehude (DE)

(73) Assignee: Airbus Deutschland GmbH, Hamburg (DE)

( * ) Notice: Subject to any disclaimer, the term of this patent is extended or adjusted under 35 U.S.C. 154(b) by 801 days.

(21) Appl. No.: 12/418,153

(22) Filed: Apr. 3, 2009

(65) Prior Publication Data

US 2010/0044514 A1 Feb. 25, 2010

Related U.S. Application Data

(60) Provisional application No. 61/124,107, filed on Apr. 14, 2008.

(51) Int. Cl.
*B64C 1/06* (2006.01)
(52) U.S. Cl. ........................................ 244/131
(58) Field of Classification Search .................. 244/131, 244/132, 125, 123, 120, 119; 228/112.1, 228/114.5, 119, 250, 150, 151
See application file for complete search history.

(56) References Cited

U.S. PATENT DOCUMENTS

| | | | |
|---|---|---|---|
| 5,203,522 A * | 4/1993 | White et al. | 244/17.11 |
| 6,276,866 B1 * | 8/2001 | Rutan | 403/375 |
| 6,328,261 B1 | 12/2001 | Wollaston et al. | |
| 7,560,152 B2 * | 7/2009 | Rajabali et al. | 428/57 |
| 7,790,261 B2 * | 9/2010 | Liggett | 428/57 |
| 2006/0060705 A1 | 3/2006 | Stulc et al. | |

FOREIGN PATENT DOCUMENTS

DE 652937 11/1937

OTHER PUBLICATIONS

German Office Action for DE 10 2008 018 772.0-22 dated Mar. 24, 2010.

* cited by examiner

*Primary Examiner* — Richard Price, Jr.
(74) *Attorney, Agent, or Firm* — Jenkins, Wilson, Taylor & Hunt, P.A.

(57) ABSTRACT

A connection arrangement for connecting a first and second reinforcing element of an aircraft or spacecraft, the reinforcing elements each have profiled cross-sections comprising at least one foot portion and at least one web portion. They are spaced from one another at their end connection faces by a strap element. The connection arrangement comprises at least one foot portion connection element, which can be adjusted and firmly joined on one side to the geometrical shape of the foot portion of the first reinforcing element, on the other side to the geometrical shape of the foot portion of the second reinforcing element and to the interposed strip element, and comprising at least one web coupling element, which can be adjusted and firmly joined on one side to the geometrical shape of the web portion of the first reinforcing element, and on the other side to the strap element. A shell component of an aircraft or spacecraft comprises at least two shell elements connected to a strap element at a transverse seam, which shell elements each comprise at least a first and second reinforcing element which, in turn, are connected to a connection arrangement.

20 Claims, 5 Drawing Sheets

CONNECTION ARRANGEMENT FOR CONNECTING A FIRST AND SECOND REINFORCING ELEMENT FOR AN AIRCRAFT OR SPACECRAFT, AND A SHELL COMPONENT

CROSS REFERENCE TO RELATED APPLICATIONS

This application claims the benefit of U.S. Provisional Application No. 61/124,107, filed Apr. 14, 2008, the entire disclosure of which is herein incorporated by reference.

FIELD OF THE INVENTION

The present invention relates to a connection arrangement for connecting a first and second reinforcing element of an aircraft or spacecraft, and to a shell component.

Although it can be applied to any desired shell components, the present invention and the problem on which it is based will be explained in greater detail hereinafter with reference to fibre composite components, for example carbon fibre reinforced plastic (CFRP) components, for example skin shells for an aircraft.

BACKGROUND OF THE INVENTION

It is generally known that CFRP skin shells can be reinforced with reinforcing elements (what are known as CFRP stringers) in order to withstand the high loads which occur in aircraft or spacecraft, with as little additional weight as possible. In this case, a distinction is basically made between two types of stringers: T-stringers and omega-stringers.

T-stringers have a narrow head portion and a wide foot portion. They are connected at the foot portion to the skin shell and, advantageously, can be produced in a simple manner.

Omega-stringers have an approximately hat-shaped profile, of which the ends are connected to the skin shell as a foot portion.

The use of fibre composite components is widespread within the aircraft industry. They are produced, for example, by vacuum infusion processes in order to introduce a matrix, for example an epoxy resin, into the fibre semi-finished products and are subsequently cured. Infusion processes may be more cost-effective than other known methods for producing fibre composite components, such as the prepreg process, since cheaper fibre semi-finished products may be used.

When producing shell components for the aircraft industry, it is thus currently imperative to use reinforcing stringers having different profile shapes. Owing to the requirement to withstand constant loading and the need to build the structures so as to be as light as possible, suitable for production and easy to service, it may be necessary to couple stringers, which may also have different profile shapes, at a transverse joint between shell elements to be connected to one another. In this case, problems may arise owing to the manufacturing tolerances of the components to be connected which, on the one hand, may lead to necessary further development and, on the other hand, to the need to also individually adjust the couplings.

The object of the present invention is therefore to provide a connection arrangement for reinforcing elements which overcomes the aforementioned drawbacks, or else considerably reduces them, and also presents further advantages.

A connection arrangement is accordingly provided for connecting a first and second reinforcing element of an aircraft or spacecraft. The reinforcing elements each have profiled cross-sections comprising at least one foot portion and at least one web portion and are spaced from one another at their end connection faces by a strap element. The connection arrangement comprises at least one foot portion connection element, which can be adjusted and firmly joined on one side to the geometrical shape of the foot portion of the first reinforcing element, on the other side to the geometrical shape of the foot portion of the second reinforcing element and to the interposed strap element. Furthermore, the connection arrangement comprises at least one web coupling element, which can be adjusted and firmly joined on one side to the geometrical shape of the web portion of the first reinforcing element, and on the other side to the strap element.

A shell component for an aircraft or spacecraft is also provided. It comprises at least two shell elements connected to a strip element at a transverse seam, said shell elements each comprising at least a first and second reinforcing element. The reinforcing elements each have profiled cross-sections comprising at least one foot portion and at least one web portion. These reinforcing elements are connected in their longitudinal direction by means of a connection arrangement and are spaced from one another at their end connection faces by the strap element. The connection arrangement is also connected to said strap element.

Advantageous developments and improvements of the present invention can be found in the dependent claims.

The invention is based on the idea of providing a connection arrangement comprising at least one foot portion connection element and one web coupling element, in which the foot portion connection element can be adjusted and firmly joined on one side to the geometrical shape of the foot portion of the first reinforcing element, on the other side to the geometrical shape of the foot portion of the second reinforcing element and to the interposed strap element, and the at least one web coupling element can be adjusted and firmly joined on one side to the geometrical shape of the web portion of the first reinforcing element, and on the other side to the strap element.

The present invention thus has the advantage, inter alia, over the aforementioned approaches that in one configuration it is possible to couple reinforcing elements across a transverse joint between two shell elements using a connection arrangement. In this case, foot portions of the reinforcing elements are connected to the interposed strap element by way of foot portion connection elements of the connection arrangement. Furthermore, the web portion of one of the reinforcing elements is coupled to the strap element independently of a foot portion connection element. The strap element connects the shell elements at the transverse joint and the connection arrangement is thus also connected to the shell elements via the strap element.

It is thus possible to compensate for manufacturing and assembly tolerances of the reinforcing elements by way of the connection, since the at least one foot portion connection element and the web coupling element are configured as what is known as a differential coupling and are not interconnected.

In a preferred embodiment, the connection arrangement can be divided into three individual components: two foot portion connection elements and one web coupling element arranged centrally therebetween. In this way, the connection arrangement elements may be produced in a highly variable and simplified manner. Any adjustments made when assembling the connection arrangement are reduced to a minimum. The foot portion connection elements and the web coupling element may, since they are not interconnected, be arranged in a transverse direction in such a way that there is space between them in the transverse direction for further joining elements, such as angle brackets for frames.

In another embodiment it is possible for reinforcing elements having different profiled cross-sections (the reinforcing elements may, for example, be configured as T-stringers and omega-stringers) to be coupled to the connection arrangement according to the invention across the transverse joint between the shell elements.

Furthermore, it is also possible to use the connection arrangement according to the invention where a longitudinal seam (longitudinal joint) of a shell element abuts a transverse seam (butt joint). The transverse seam is provided for coupling to the strap element (peripheral strip or butt strap) and the longitudinal seam is coupled by a strip element (longitudinal strap). A reinforcing element, for example a T-stringer, is arranged on the strip element and as a result of being fixed, for example riveted in place, also reinforces the longitudinal seam. The strip element may be widened in the region of the transverse joint. In this case a non-positive connection is formed with the foot portion of the reinforcing element. Furthermore, the join between a strap element and strip element can be connected by means of an additional cross-strap element which is also arranged between the end faces of the reinforcing elements.

The web coupling element can be adjusted and firmly joined on one side to the respective geometrical shape of the web portion and of the foot portion of the first reinforcing element, and on the other side to the strap element. This is enabled in a preferred embodiment in that the web coupling element comprises a web coupling portion for connection to the web portion of the first reinforcing element and a strap connection portion for connection to the strap element. The web coupling portion and the strap connection portion are preferably interconnected, for example in the manner of a T-shaped profile.

In an alternative embodiment, for example for higher loads, the web coupling element may also comprise, in addition to the web coupling portion m for connection to the web portion m of the first reinforcing element and in addition to the strap connection portion for connection to the strap element, a foot connection portion for connection to the foot portion of the first reinforcing element. It is thus preferable for the foot connection portion to comprise a recess for receiving the web portion of the first reinforcing element. The recess may be configured in such a way that the web portion, for example a portion of a web of a T-stringer, can be received. Other shapes are of course possible for different webs.

In order to ensure that the load is transferred smoothly and evenly, the free end of the web coupling portion of the web coupling element may be bevelled. The bevel may be at a predetermined angle, preferably between 15° and 45°.

In one embodiment, the foot portion connection elements are configured so as to have an L-shaped profile but may, for example, also comprise flat material or have a differently shaped profile. Since construction of the connection arrangement may vary independently of the web coupling elements, individual connections of stringer foot portions having the same or even different shapes of stringer profiles may be produced, independently of the profile shape. Consequently, it is not necessary to use a wide variety of parts even within a large field of application.

The foot portion connection element is preferably configured so as to have an L-shaped profile and, consequently, a cost-effective standard profile which can be cut to length and is of good quality may be used. Other profile shapes are of course conceivable. The foot portion connection elements, may, for example, be cut from the same profiled rod for both sides of the connection arrangement, no mirror-image embodiments being necessary.

In this case also, the free ends of the projecting arm of the foot portion connection element may each be bevelled so as to ensure that the load is transferred smoothly and evenly. This bevel may be at a predetermined angle, for example between 15° and 45°.

The free end of the second reinforcing element may also be bevelled. If the second reinforcing element is an omega-stringer for example, its free web end may be elliptically bevelled within the aforementioned angular ranges.

The foot portion connection element and the web coupling element may be made of metal or/and composite material, for example fibre composite material, or a combination thereof. They may be joined and connected, for example by rivets.

If made of metal, the height may be leveled directly in the connection region, for example between the strap elements and foot portions, by corresponding reinforcements joggles), shims not being necessary. If fibre composite materials are used, height is leveled using rigid spacers (shim plates).

It is preferable for at least one foot portion of the reinforcing elements to be widened at the connection site of the reinforcing elements. Consequently, a larger support surface is provided for the foot portion connection elements for an advantageously large load transfer and increased rigidity.

Rigidity may be adjusted in accordance with the application requirements and any lateral tolerance compensated for by mechanically trimming the elements of the connection arrangement.

A shell component may comprise the aforementioned connection arrangement.

BRIEF DESCRIPTION OF THE DRAWINGS

The invention will be described in greater detail hereinafter with reference to embodiments and to the accompanying figures of the drawings, in which.

In the figures, like reference numerals refer to like or functionally similar elements, unless otherwise indicated.

DETAILED DESCRIPTION OF THE DRAWINGS

Figure 1:
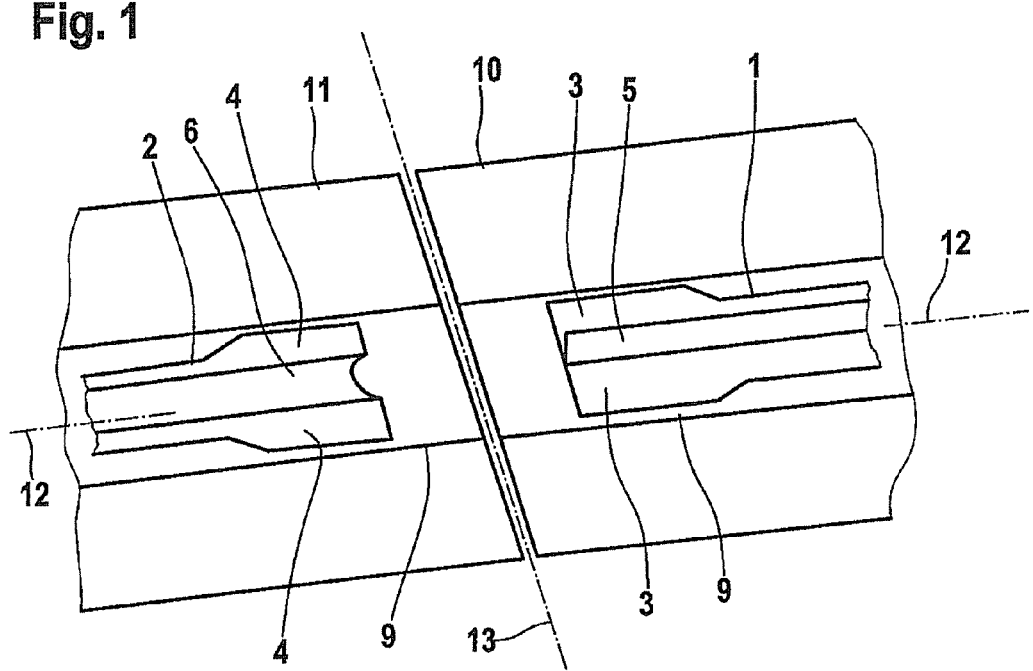
FIG. 1 is a schematic perspective view of an exemplary connection site with a transverse joint between two shell elements having different reinforcing elements.

FIG. 1 is a schematic perspective view of an exemplary connection site with a transverse joint between two shell elements 10, 11 of a shell component. The shell elements 10, 11 are, for example, skin shells for an aircraft and are made of a fibre composite material, but may also be made of a metal material. They are fitted with different reinforcing elements 1, 2 in respective reinforcing regions 9. The transverse joint is shown with a transverse seam 13 which is enlarged in the figure. The transverse seam 13 is also known as butt joint. The two reinforcing elements 1, 2 have different profiled cross-sections in this example. Reinforcing element 1 is a T-stringer (T-shaped profile) and reinforcing element 2 is what is known as an omega-stringer (omega-shaped profile). The reinforcing elements 1, 2 are arranged in a longitudinal direction 12.

Figure 3:
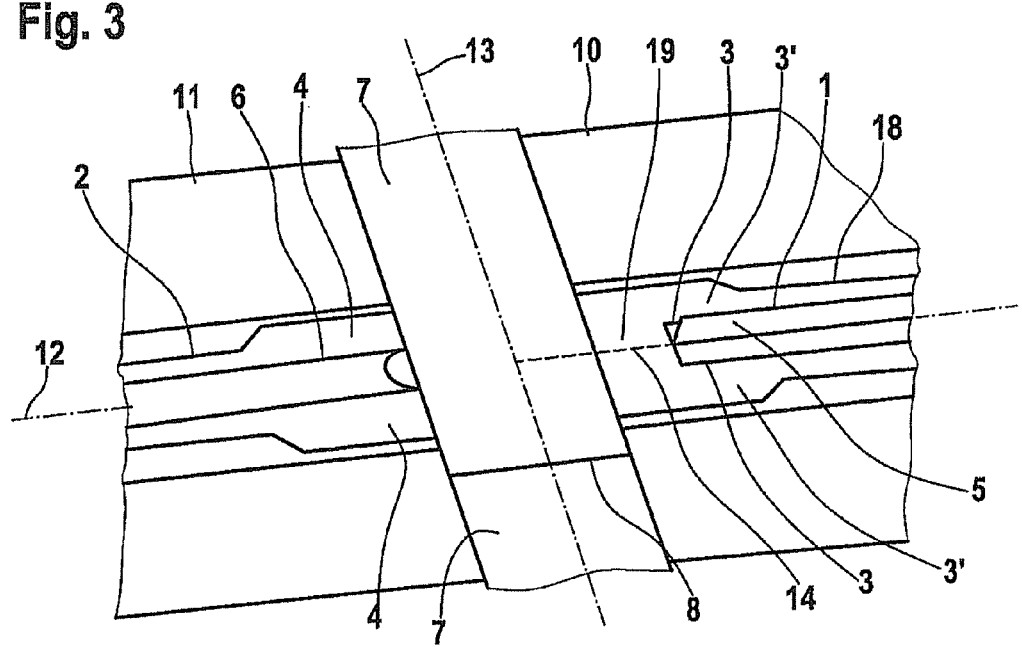
FIG. 3 is the view according to FIG. 2 with a strap element.

The two reinforcing elements 1, 2 are in this case arranged at a distance from the edge of the connection site or transverse seam 13 between the shell elements 10, 11, in which gap a strap element 7 is arranged so as to connect the shell elements 10, 11, as is explained further in FIG. 3. The respective foot portions 3, 4 of the two reinforcing elements 1, 2 widen towards the connection region or transverse seam 13 in the longitudinal direction 12.

The first reinforcing element 1 is in this case configured as a T-stringer comprising a foot portion 3 and a web portion 5. In contrast, the second reinforcing element 2 comprises an omega-shaped hollow profiled cross-section with a web portion 6 and a foot portion 4 and will be referred to in this embodiment as an omega-stringer.

Figure 2:
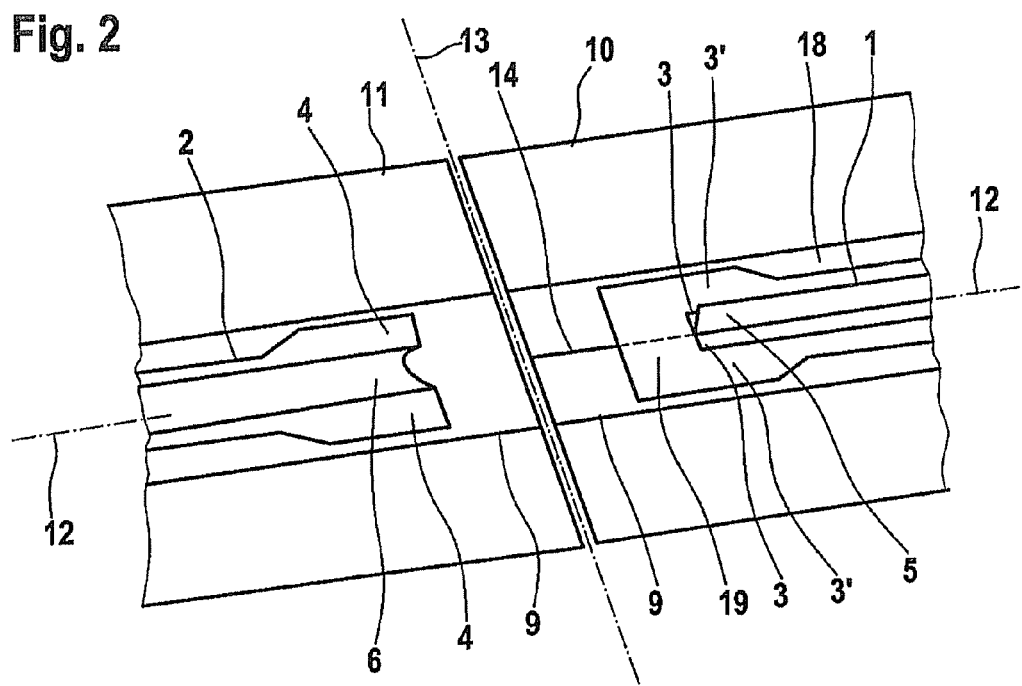
FIG. 2 is a schematic perspective view of an exemplary connection site with a transverse joint between two shell elements having different reinforcing elements, a longitudinal seam of a shell element being arranged within the connection site.

FIG. 2 is a schematic perspective view of the connection site already described in FIG. 1 and shows another exemplary connection site with a transverse joint between the two shell elements 10, 11 comprising different reinforcing elements 1, 2, a longitudinal seam 14 (also known as a longitudinal joint) of a shell element 10 being arranged within the connection site. This longitudinal seam 14 (the region shown towards the transverse seam with a dashed line) is covered and connected on both sides, for example by way of riveting, by a strap element 18, which may be referred to as a longitudinal strap, and may additionally be reinforced, for example also by way of riveting, by the T-stringer fixed thereupon as a first reinforcing element 1. In addition, the rivets with which the T-stringer is additionally fixed to the shell element 10 via its foot portions 3, on the strap element 18 and penetrating therethrough on both sides of the longitudinal groove 14, act as a reinforcement.

In this arrangement, the foot portion 4 of the second reinforcing element 2 arranged at the transverse seam 13 is also widened. The strip element 18 is in this case widened opposite the second reinforcing element 2 in the longitudinal direction 12 so as to form a connection portion 19 (described in more detail below) and forms foot portions 3' which are non-positively connected to the respective foot portions 3 of the first reinforcing element 1. In an alternative embodiment (not shown), the foot portions 3 of the first reinforcing element 1 may also be widened, as shown in FIG. 1.

FIG. 3 is a view according to FIG. 2 comprising a strap element 7 which covers the transverse seam 13 and connects the shell elements 10, 11, for example by way of riveting on both sides of the transverse seam 13. The strap element 7 is also known as a butt strap and comprises a transverse strap seam 8 which, in this example, is arranged within the connection region.

The longitudinal seam 14 (shown as a dashed line in the connection region) is covered in a portion abutting the transverse seams 13 by the strap element 7, for example by way of riveting, and is held together on both sides in this portion. The strap element 7 is arranged in the space between the end face of the second reinforcing element 2 and the opposite edge of the strip element 18 (see FIG. 2) and separates said elements.

Figure 4:
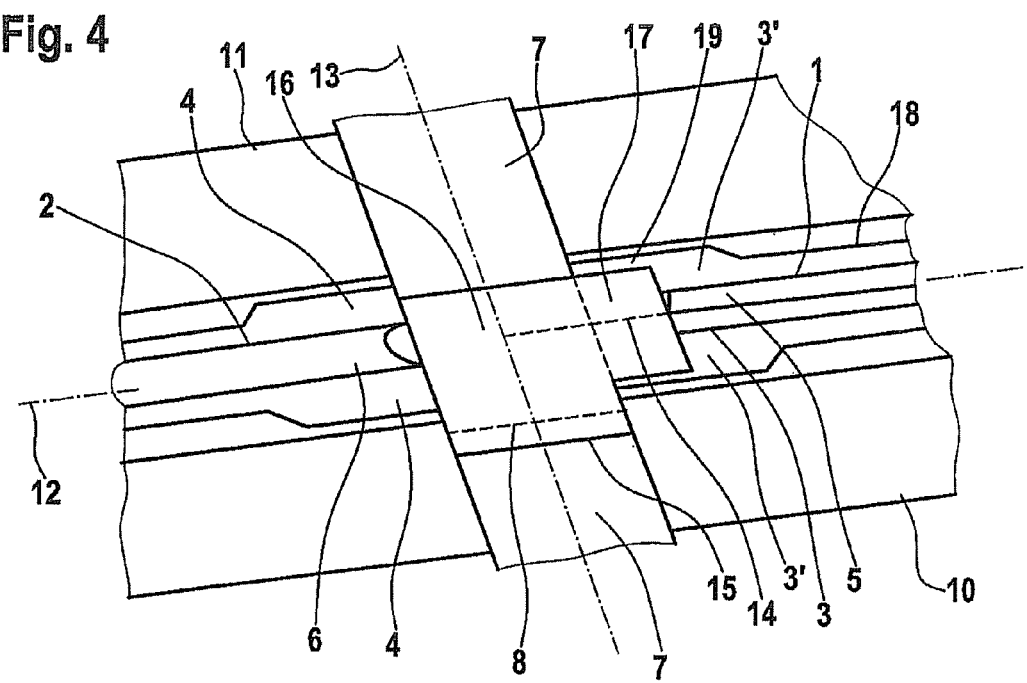
FIG. 4 is the view according to FIG. 3 with a cross-strap element.

FIG. 4 shows FIG. 3 with a further strap element 15 which separates the end faces of the reinforcing elements 1, 2 as what is known as a cross-strap element 15 and simultaneously couples the transverse strap seam 8 to a transverse strap connection portion 16 and couples the connection portion 19 of the strip element 18 to a strip element connection 17 over the longitudinal seam 14 abutting the transverse seam 13.

Figure 5:
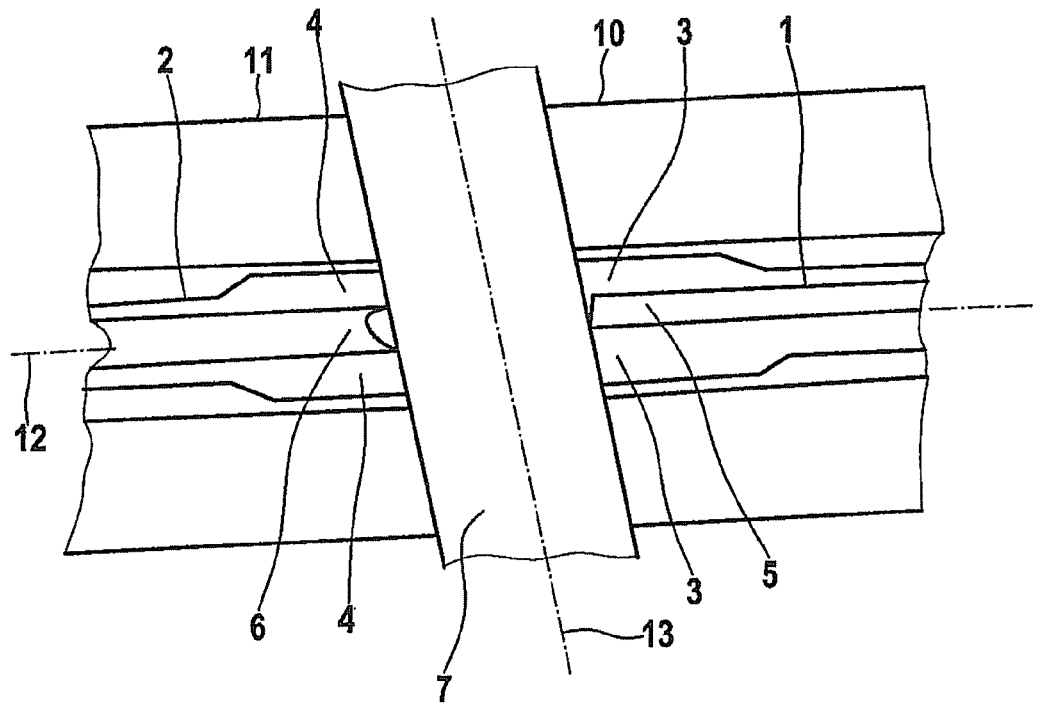
FIG. 5 is the view according to FIG. 1 with a strap element.

Similarly, FIG. 5 shows the view according to FIG. 1 with the strap element 7, wherein in this example there is no longitudinal seam 14 in the connection region. Thereby, the end faces of the reinforcing elements 1, 2 are separated by the strap element 7 which connects the shell elements 10, 11 via the transverse seam 13.

When connecting the shell elements 10, 11 in accordance with the examples shown in FIGS. 4 and 5, it is also necessary to connect the reinforcing elements 1, 2 so as to transfer any loading and so as to offer reinforcement. For this purpose, the reinforcing elements 1 and 2 to be connected should lie as flush as possible in the longitudinal direction 12 and should not be offset laterally.

In the case of the aforementioned connections between shell elements, it is also necessary for the reinforcing elements 1, 2 to be connected, as will be described hereinafter.

Figure 6:
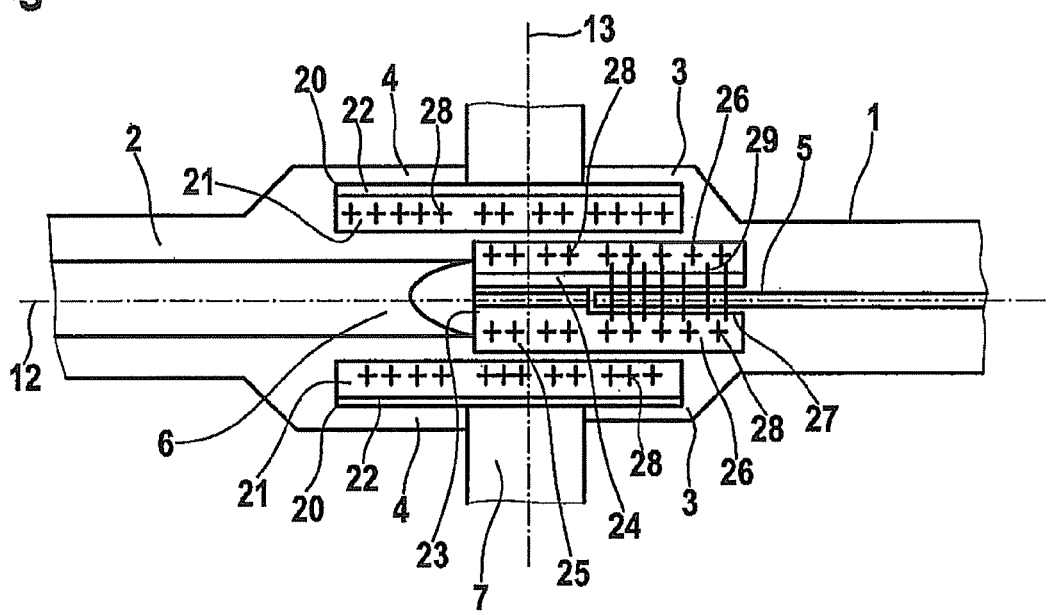
FIG. 6 is a plan view of a first embodiment of a connection arrangement according to the invention.

FIG. 6 is a plan view of a first embodiment of a connection arrangement according to the invention for connecting the first and second reinforcing elements 1 and 2, which are spaced apart by the strip element 7, as is shown in FIG. 5.

In FIG. 5, the shell elements are not shown for reasons of clarity. The connection arrangement consists of two foot portion connection elements 20, which connect the foot portions 3 and 4 of the reinforcing elements 1 and 2 to be connected on both longitudinal sides of the reinforcing elements 1, 2. At the same time, the two foot portion connection elements 20 are also connected to the strap element 7 arranged between the end faces of the reinforcing elements 1, 2. The connections are, in this example, fixing elements 28, for example rivets.

The foot portion connection element 20 is in this case cut from an L-shaped profiled rod. It comprises a fixing portion 21 and an arm 22 extending in a substantially perpendicular direction from said fixing portion at the edge thereof. The fixing portion 21 of any of the foot portion connection elements 20 is in this case used as a connection with the foot portions 3, 4 and the strap element 7. Of course, other shapes of profiles are conceivable for the foot portion connection element 20.

In order to obtain a large load transfer surface, the respective foot portions 3, 4 of the opposite ends of the reinforcing elements 1, 2 are widened in this example. The widening at these connection sites may, however, be correspondingly adjusted beforehand in accordance with the embodiment. Consequently, there may also be some clearance at right angles to the longitudinal direction 12, so as to compensate for tolerances for example. The foot portion connection element 20 may be made of metal and/or fibre composite material.

The connection arrangement further comprises a web coupling element 23 which, in this embodiment, is arranged centrally between the foot portion connection elements 20. It connects the web portion 5 of the first reinforcing element 1 to the strap element 15 and thus to the shell elements connected via the strap element 7. In the example shown, the web coupling element 23 is also coupled to the foot portions 3 of the first reinforcing element 1.

The web coupling element 23 comprises a web coupling portion 24 for coupling to the web portion 5, which web coupling portion is arranged perpendicular and substantially parallel to the longitudinal direction 12 on a strap connection portion 25 of the web coupling element 23. The strap connection portion 25 connects the web coupling element 23 to the strap element 7. In order to connect to the foot portions 3 of the first reinforcing element 1, the strap connection portion 25 widens in the longitudinal direction 12 so as to form a foot connection portion 26 which connects to the foot portions 3 of the first reinforcing element 2. In this example, the foot connection portion 26 comprises, in the central region and parallel to the longitudinal direction 12, a recess 27 for receiving the web portion 5 of the first reinforcing element 1.

The web coupling portion 24 is offset relative to the longitudinal direction 12, which in this case is also the longitudinal centre line of the web coupling element 23. Other embodiments are also possible. Two web coupling portions 24 may, for example, be arranged parallel and spaced at a distance equal to the thickness of the web portion 5.

The web coupling element 23 is connected to the web coupling portion 24 by way of fixing elements 29. Fixing elements 28 produce the connections between the strap connection portion 25 and the strap element 7 and the between the foot connection portion 26 and foot portions 3 of the first reinforcing element 1. In this case, the fixing elements 28, 29 may also be rivets.

The web coupling element 23 may also be made of metal and/or a composite material, as is the foot portion connection element 20.

By machine processing the connection arrangement, the stability of its components can be adjusted to the application requirements and lateral tolerance can be compensated for. In the present example according to FIG. 6, any lateral misalignment of the reinforcing elements 1, 2 can easily be compensated for within a specific region, since the web coupling element 23 can be arranged independently of the foot portion connection elements 20. This type of differential coupling offers this advantage.

If the connection arrangement is made of metal, the height can be levelled by corresponding reinforcements (what are known as joggles), in which case it is not necessary to use rigid shims or shim plates, such as those used if the connection arrangement is made of fibre composite materials. It may be necessary to level the height if there are differences in height between the strip element(s) and foot portions.

The connection arrangement connects the foot portions 3, 4 of the reinforcing elements to the foot portion connection elements 20 across the transverse joint by way of the transverse seam 13 of the shell elements 10, 11, a connection to the strap element 7 which couples the transverse joint being produced at the same time. Using the web coupling element 23, the web portion 5 of the first reinforcing element is coupled to the strap element 7. At the same time, the foot portions 3 of the first reinforcing element 1 may also be coupled via the web coupling element 23 to the strap element 7, a greater transfer of load or force being possible.

The free ends of the web coupling portion 24 and the arm 22 of the foot portion connection element 20 are bevelled so as to ensure a smooth and even load transfer. This can be seen in FIGS. 7 and 8. The free web end of the second reinforcing element 1, in this case an omega-stringer, is also bevelled or elliptically bevelled. The angle of bevel preferably lies within the range of 15° to 45° for example, but other ranges are also possible.

Figure 7:
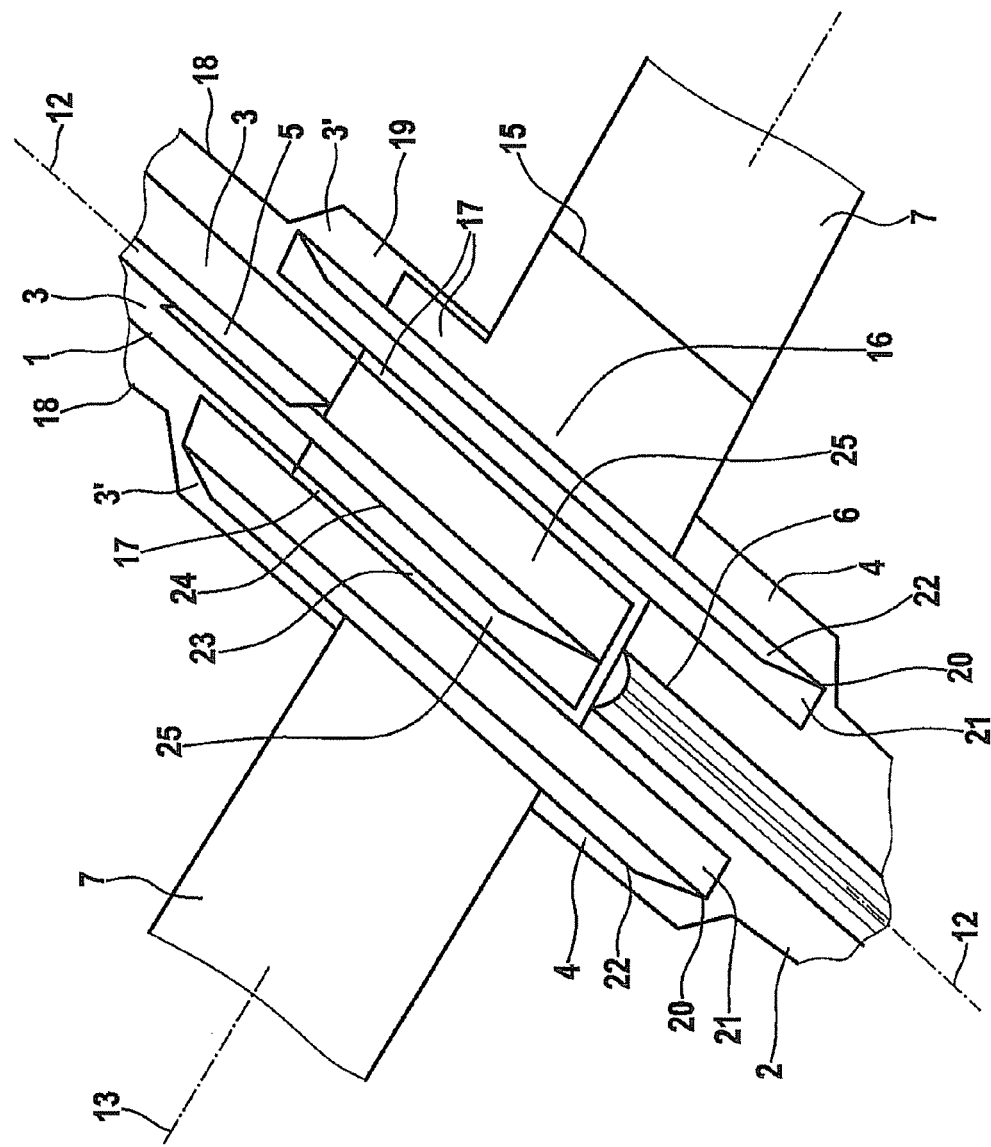
FIG. 7 is a perspective view of a second embodiment of the connection arrangement according to the invention.

If a longitudinal seam 14 and a transverse seam 13 meet in the connection region of the shell elements 10, 11, as is shown in FIGS. 2 to 4, the reinforcing elements 1, 2 are connected to a connection arrangement in accordance with a second embodiment, of which a perspective view is shown in FIG. 7, fixing elements 28 not being shown.

The foot portion connection elements 20 of the connection arrangement connect the foot portions 4 of the second reinforcing element 2 to foot portions 3', which are a component of the widened connection portion 19 of the strip element 18, and to the foot portions 3 of the first reinforcing element 1 in a non-positive manner. In this example, the first reinforcing element 1 does not have widened foot portions 3, although this may of course be reversed in another embodiment. Furthermore, the foot portion connection elements 20 are connected both to the strap element 7 and to the cross-strap element 15 arranged thereabove, the function of which cross-strap element is explained above. In this case, it may be necessary to level out any differences in height, as described above.

The web coupling element 23 only comprises the web coupling portion 24 and the strap connection portion 25. The web coupling portion 24 extends out in the longitudinal direction from the strap connection portion 25 by a specific amount so as to form a coupling to the web portion 2 of the first reinforcing element 1. The strap connection portion 25 is connected to the shell elements 10, 11 (not shown) via the cross-strap element 15 and the strap element 7 arranged therebelow.

The connections to the cross-strap element 15 by way of the connection arrangement are arranged both in the region of its transverse strap connection portion 16 and of its strip element connection portion 17.

In this figure, the aforementioned bevels of the free ends of the connection arrangement and the second reinforcing element 2 are shown.

The differential connection arrangement makes it possible for further elements for connecting other components to be arranged in the space formed between the foot portion connection elements 20 and the central web coupling element 23 owing to the independent arrangement of the individual components, as described above.

Figure 8:
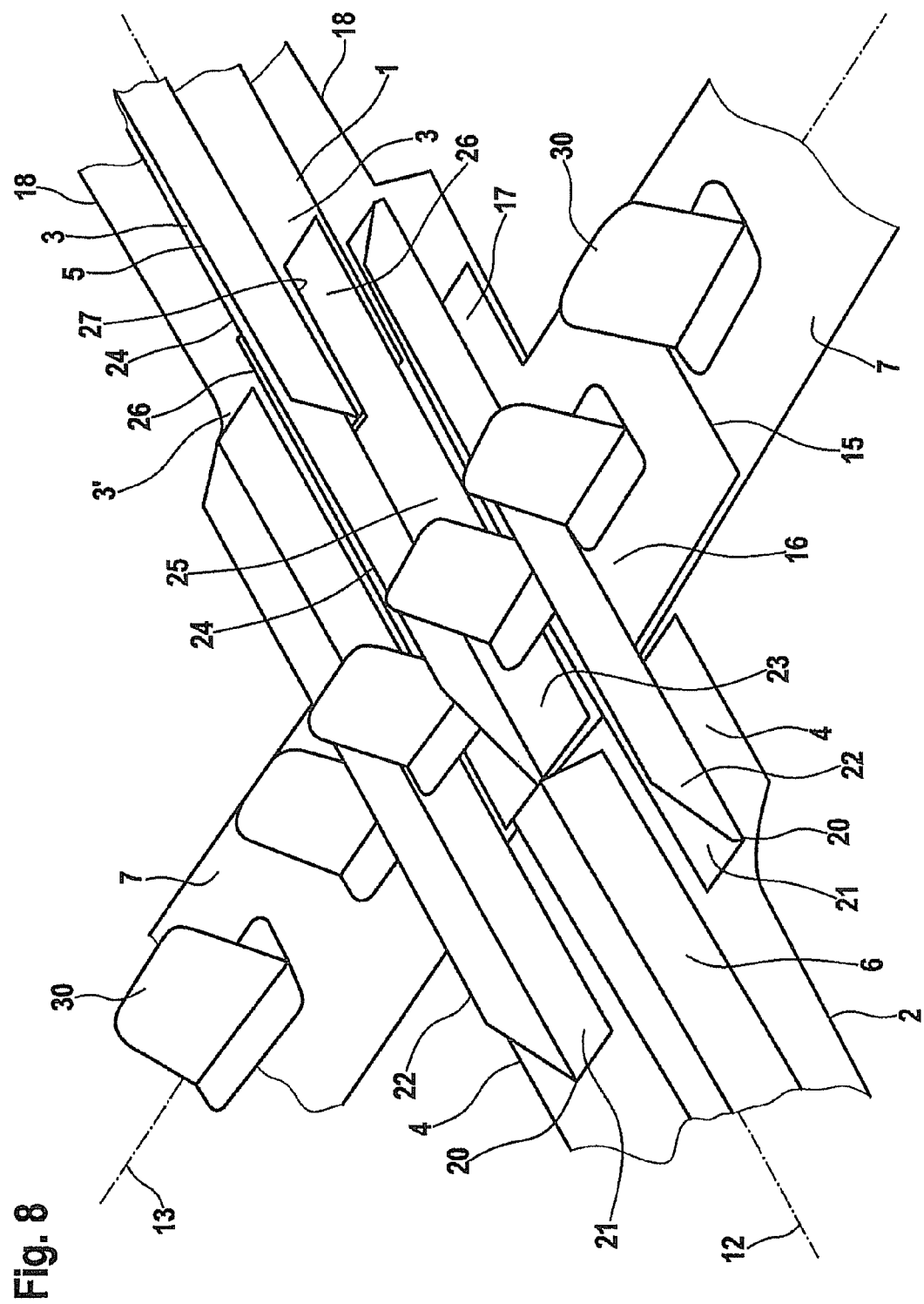
FIG. 8 is a perspective view of a third embodiment of the connection arrangement according to the invention.

In this context, FIG. 8 shows a perspective view of a third embodiment of the connection arrangement according to the invention (the fixing elements are not shown for reasons of clarity). In this case, the arrangement of FIG. 7 is shown, only the differences therefrom being explained below.

The web coupling element 23 in this case comprises a foot connection portion 26 for joining to the foot portions 3 of the first reinforcing element 1. The foot connection portion 26 surrounds the web portion 2 which is received in the recess 27 of the foot connection portion 26.

Joining elements 30 are arranged on the strap elements 7 and 15 at an angle and may also be arranged in the spaces formed in the connection arrangement, as described above. The joining elements 30 are used, for example, to join a frame.

Although the present invention has been described with reference to preferred embodiments, it is not limited to these embodiments and can be combined and modified in a versatile manner.

For example, reinforcing elements having identical profiled cross-sections may also be connected by way of the connection arrangement.

It is conceivable for the web coupling element 23 to consist of two profiled couplings which are independently arranged opposite one another, the web coupling portion of the first profiled coupling being connected to the web portion of the first reinforcing element, and the web coupling portion of the second profiled coupling being connected to the web portion of the second reinforcing element.

In the case of a connection arrangement for connecting a first and second reinforcing element 1, 2 of an aircraft or spacecraft, the reinforcing elements 1, 2 each have profiled cross-sections comprising at least one foot portion 3, 4 and at least one web portion 5, 6. They are spaced from one another at their end connection faces by a strap element 7, 15. The connection arrangement comprises at least one foot portion connection element 20, which can be adjusted and firmly joined on one side to the geometrical shape of the foot portion 3, 3' of the first reinforcing element 1, on the other side to the geometrical shape of the foot portion 4 of the second reinforcing element 2 and to the interposed strap element 7, 15, and comprises at least one web coupling element 23, which can be adjusted and firmly joined on one side to the geometrical shape of the web portion 5 of the first reinforcing element 1, and on the other side to the strap element 7, 15. A shell component of an aircraft or spacecraft comprises at least two shell elements 10, 11 connected to a strap element 7 at a transverse seam 13, which shell elements each comprise at least a first and second reinforcing element 1, 2 which, in turn, are connected to a connection arrangement.

In a preferred modification of the present invention, the foot portion connection element and the web coupling element are made of a metal and/or composite material.

In another preferred modification of the present invention, the foot portion connection element and the web coupling element are configured so as to be connectable to the reinforcing elements to be connected and to the strap element by means of riveting.

In a further preferred modification of the present invention, the first reinforcing element is a T-shaped stringer and the second reinforcing element is an omega-stringer.

The invention claimed is:

1. Connection arrangement for connecting a first and second reinforcing element of an aircraft or spacecraft, wherein the reinforcing elements each have a profiled cross-section comprising at least one foot portion and at least one web portion and are spaced from one another at their end connection faces by a strap element, with: at least one foot portion connection element, which can be adjusted and firmly joined on one side to the geometric shape of the foot portion of the first reinforcing element, on the other side to the geometric shape of the foot portion of the second reinforcing element and to the interposed strap element; and at least one web coupling element, which can be adjusted and firmly joined on one side to the geometric shape of the web portion of the first reinforcing element, and on the other side to the strap element.

2. Connection arrangement according to claim 1, wherein the first reinforcing element and the second reinforcing element have different profiled cross-sections.

3. Connection arrangement according to claim 2, wherein the first reinforcing element is a T-stringer and the second reinforcing element is an omega-stringer.

4. Connection arrangement according to claim 1, wherein the at least one foot portion of a reinforcing element is a foot portion of a strip element connected non-positively to the at least one foot portion of the respective reinforcing element.

5. Connection arrangement according to claim 1, wherein the web coupling element can be adjusted and firmly joined on one side to the respective geometrical shape of the web portion and of the foot portion of the first reinforcing element, and on the other side to the strap element.

6. Connection arrangement according to claim 1, wherein the web coupling element comprises a web coupling portion for connection to the web portion of the first reinforcing element and a strap connection portion for connection to the strap element.

7. Connection arrangement according claim 5, wherein the web coupling element comprises a web coupling portion for connection to the web portion of the first reinforcing element, a strap connection portion for connection to the strap element and a foot connection portion for connection to the foot portion of the first reinforcing element.

8. Connection arrangement according to claim 7, wherein the foot connection portion comprises a recess for receiving the web portion of the first reinforcing element.

9. Connection arrangement according to claim 6, wherein the free end of the web coupling portion of the web coupling element is bevelled at a predetermined angle.

10. Connection arrangement according to claim 1, wherein one foot portion connection element is arranged on either side of the web portions, respectively, of the reinforcing elements to be connected, and can be connected to the corresponding foot portions and to the strap element.

11. Connection arrangement according to claim 1, wherein the web coupling element has a T-shaped profile.

12. Connection arrangement according to claim 1, wherein the foot portion connection element has an L-shaped profile.

13. Connection arrangement according to claim 12, wherein the free ends of the projecting arm of the L-shaped profile of the foot portion connection element are bevelled at a predetermined angle.

14. Connection arrangement according to claim 1, wherein the free end of the web portion of the second reinforcing element is bevelled at a predetermined angle.

15. A shell component of an aircraft or spacecraft, comprising:
at least two shell elements connected to a strap element at a transverse seam, each comprising:
at least a first and second reinforcing element, wherein the reinforcing elements each has a profiled cross-section comprising at least one foot portion and at least one web portion; and
said at least one foot portion and at least one web portion being spaced from one another at their end connection faces by the strap element and in their longitudinal direction being connected across the transverse seam by a connection arrangement, the connection arrangement being connected to the strap element.

16. The shell component according to claim 15, wherein at least one of the at least two shell elements comprises a longitudinal seam with a strip element, on which the first reinforcing element is arranged, and wherein a cross-strap element connects the strap element and a connection portion of the strip element.

17. The shell component according to claim 16, wherein the connection arrangement is connected to the strap element and to the cross-strap element.

18. The shell component according to claim 15, wherein at least one foot portion of the reinforcing elements is widened at the connection site of the reinforcing elements.

19. The shell component according to claim 15, wherein the at least one foot portion of one reinforcing element is a portion of the strip element connected non-positively to the at least one foot portion of the respective reinforcing element.

20. The shell component according to claim 15, wherein the connection arrangement is a connection arrangement according to claim 1.

* * * * *